(12) United States Patent
Fukawatase et al.

(10) Patent No.: US 8,366,143 B2
(45) Date of Patent: Feb. 5, 2013

(54) KNEE AIRBAG DEVICE AND CONNECTING METHOD THEREOF

(75) Inventors: Osamu Fukawatase, Nishikamo-gun (JP); Kenji Imamura, Kosai (JP); Akiyoshi Sanada, Nishikamo-gun (JP); Yuichi Adachi, Nishikasugai-gun (JP); Kazuaki Bito, Nishikasugai-gun (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 13/604,061

(22) Filed: Sep. 5, 2012

(65) Prior Publication Data

US 2012/0326419 A1 Dec. 27, 2012

Related U.S. Application Data

(62) Division of application No. 12/451,223, filed as application No. PCT/IB2008/001136 on May 8, 2008, now Pat. No. 8,282,123.

(30) Foreign Application Priority Data

May 9, 2007 (JP) .................................. 2007-124669

(51) Int. Cl.
*B60R 21/206* (2011.01)
(52) U.S. Cl. .................................. 280/730.1; 280/728.2
(58) Field of Classification Search ............... 280/728.2, 280/728.3, 730.1, 731
See application file for complete search history.

(56) References Cited

U.S. PATENT DOCUMENTS

| | | | |
|---|---|---|---|
| 5,489,116 A | 2/1996 | Boag | |
| 5,570,901 A | 11/1996 | Fyrainer | |
| 2004/0026903 A1 | 2/2004 | Abe | |
| 2008/0211212 A1* | 9/2008 | Adachi et al. | 280/731 |

FOREIGN PATENT DOCUMENTS

| | | |
|---|---|---|
| DE | 198 09 428 A1 | 9/1999 |
| DE | 201 17 794 U1 | 7/2002 |
| DE | 20 2006 001 826 U1 | 6/2006 |
| EP | 0 684 167 A1 | 11/1995 |
| JP | A-2001-58572 | 3/2001 |
| JP | A-2001-180419 | 7/2001 |
| JP | A-2002-37003 | 2/2002 |
| JP | A-2004-26039 | 1/2004 |
| JP | A-2004-291735 | 10/2004 |
| JP | A-2006-36141 | 2/2006 |

OTHER PUBLICATIONS

Feb. 17, 2009 Office Action Issued in Japanese Patent Application No. 2007-124669 (with translation).
Sep. 19, 2008 Search Report Issued in International Application No. PCT/IB2008/001136.
Jun. 2, 2009 Written Opinion of the International Preliminary Examining Authority Issued in International Application No. PCT/IB2008/001136.
Sep. 19, 2008 Written Opinion International Searching Authority Issued in International Application No. PCT/IB2008/001136.

* cited by examiner

*Primary Examiner* — Paul N Dickson
*Assistant Examiner* — James English
(74) *Attorney, Agent, or Firm* — Oliff & Berridge, PLC

(57) ABSTRACT

A knee airbag device includes a column cover that covers a rear end portion of a steering column from below; and an airbag module. The airbag module is disposed in a column lower cover and includes a gas generation portion that generates gas and a knee airbag that is housed in the airbag module in a folded state, and is inflated and deployed by the gas supplied by the gas generation portion. The airbag module is connected to the steering column by a snap-fit action.

8 Claims, 8 Drawing Sheets

F I G. 3A
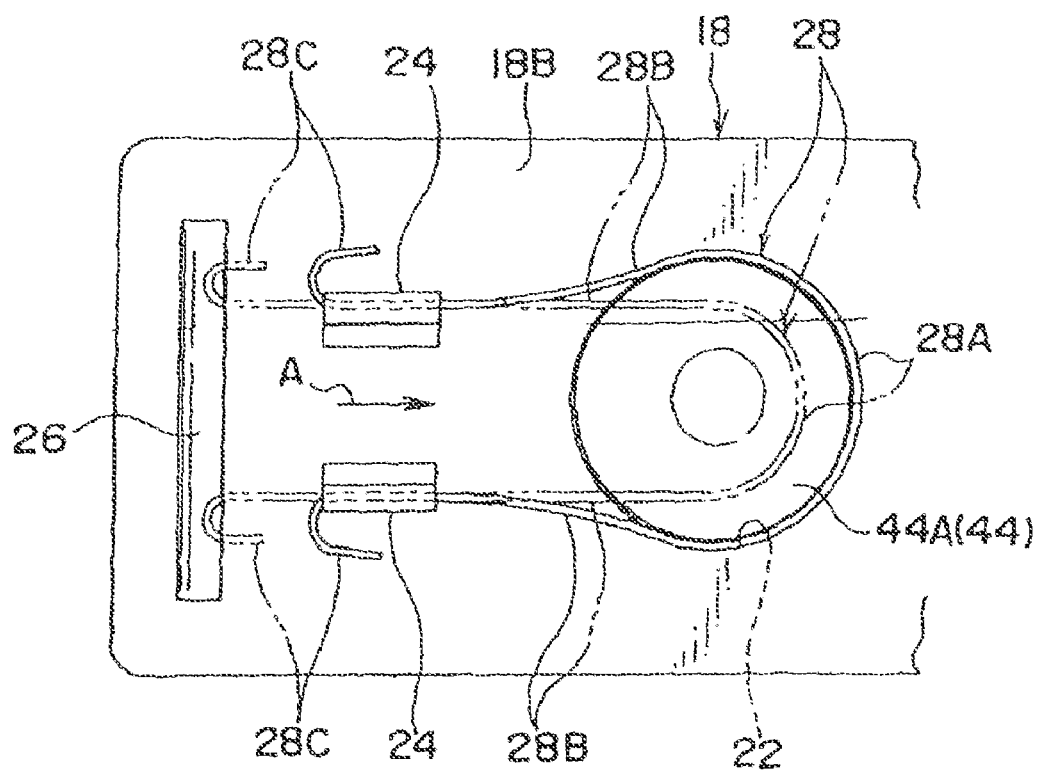

F I G. 5
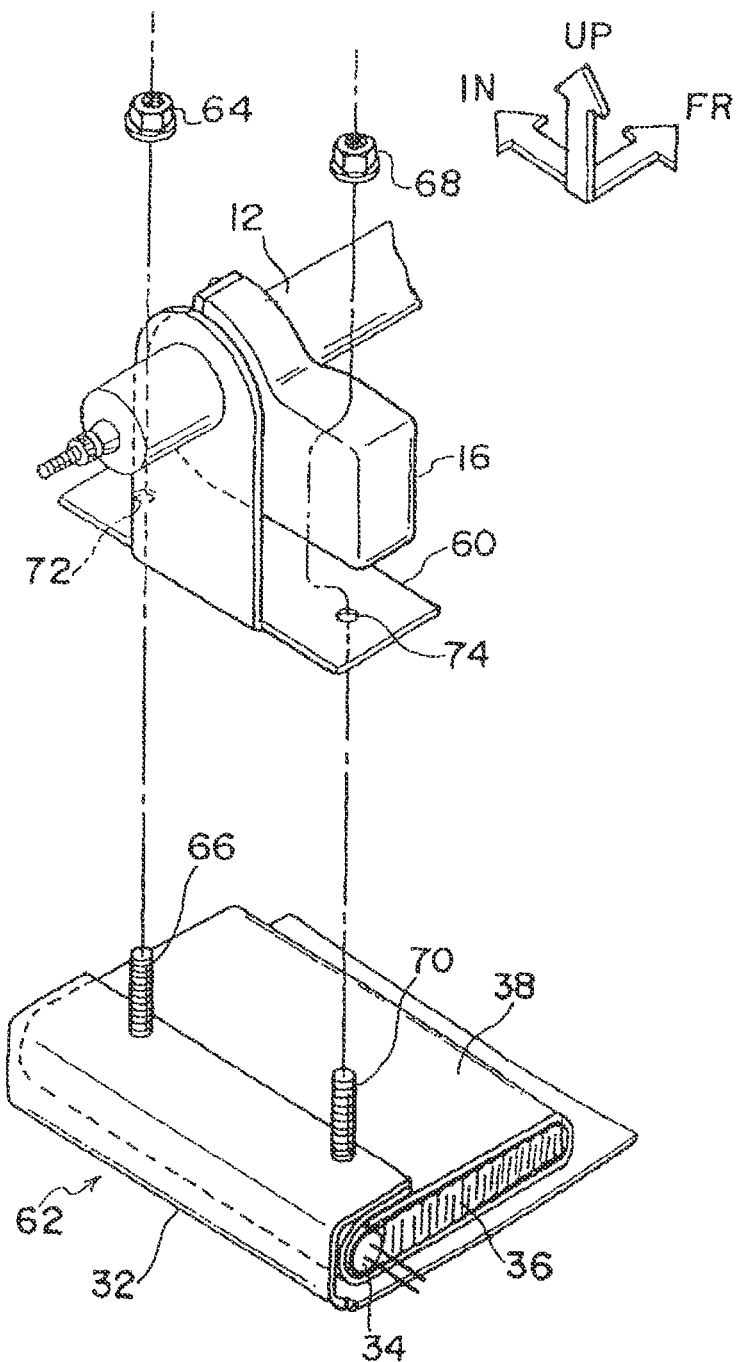

KNEE AIRBAG DEVICE AND CONNECTING METHOD THEREOF

This is a Division of application Ser. No. 12/451,223 filed Nov. 2, 2009, which in turn is a National Phase of Application No. PCT/IB2008/001136 filed May 8, 2008 claiming priority from JP 2007-124669 filed May 9, 2007. The disclosure of the prior applications is hereby incorporated by reference herein in its entirety.

BACKGROUND OF THE INVENTION

1. Field of the Invention

The invention relates to a knee airbag device that is inflated and deployed to restrain knees of an occupant when a vehicle has a collision, and also relates to a method of connecting the knee airbag device.

2. Description of the Related Art

Conventionally, various knee airbag devices have been proposed to protect knees of an occupant. For example, Japanese Patent Application Publication No. 2002-037003 (JP-A-2002-037003) describes a knee airbag device in which an airbag module is disposed inside a column cover that covers a steering column.

Generally, a steering lock is attached to the steering column above an airbag module in a manner such that the steering lock is housed in the column cover, and the steering lock overlaps with the airbag module when viewed from above the steering column. Therefore, when the airbag module is connected to the steering column, to fit nuts to bolts in a direction from above the steering column, the airbag module needs to be connected to the steering column before the steering lock is fitted to the steering column. This imposes a restriction on the fitting procedure, and makes the fitting operation complicated.

Furthermore, once the steering lock is fitted to the steering column, it is not possible to remove the airbag module from the steering column (because there is no enough space to place tools in). Therefore, for example, when the airbag module needs to be removed in order to check the airbag module, the entire steering column needs to be removed from the vehicle body, and thus, a large-scale operation is required.

When the airbag module is connected to the steering column, the airbag module is housed in the column lower cover, and therefore the airbag module and the column lower cover closely relate to each other in the fitting operation. Therefore, if it is difficult to connect the airbag module to the steering column due to the configuration, it tends to be difficult to fix the column lower cover, which houses the airbag module, below the steering column.

SUMMARY OF THE INVENTION

The invention relates to a knee airbag device in which an airbag module and a column lower cover are easily connected to a steering column, and furthermore, the airbag module is easily removed from the steering column, for example, when the airbag module needs be checked. The invention also relates to a method of connecting the knee airbag device.

According to a first aspect of the invention, a knee airbag device includes: a column lower cover that covers a rear end portion of a steering column from below; and an airbag module disposed inside the column lower cover when the airbag module is connected to the steering column. The airbag module includes a gas generation portion that generates gas when the gas generation portion is operated, and a knee airbag that is housed in the airbag module in a folded state and is inflated and deployed by the gas supplied from the gas generation portion. In the knee airbag device, the airbag module is connected to the steering column by a snap-fit action.

According to a second aspect of the invention, a knee airbag device includes: a column lower cover that covers a rear end portion of a steering column from below; an airbag module disposed inside the column lower cover when the airbag module is connected to the steering column; and at least one fixing member that connects the airbag module to the steering column. The airbag module includes a gas generation portion that generates gas when the gas generation portion is operated, and a knee airbag that is housed in the airbag module in a folded state and is inflated and deployed by the gas supplied from the gas generation portion. In the knee airbag device, the airbag module is connected to the steering column by sliding the at least one fixing member.

According to a third aspect of the invention, a knee airbag device includes: a column lower cover that covers a rear end portion of a steering column from below; an airbag module disposed inside the column lower cover when the airbag module is connected to the steering column; and at least one fixing mechanism that removably connects the airbag module to the steering column. The airbag module includes a gas generation portion that generates gas when the gas generation portion is operated, and a knee airbag that is housed in the airbag module in a folded state and is inflated and deployed by the gas supplied from the gas generation portion. In the knee airbag device, the airbag module is fixed to the steering column by operating the at least one fixing mechanism one time, and is released from the steering column by operating the at least one fixing mechanism one time.

According to the first to third aspects of the invention, when the vehicle has a collision with a collision object, the gas generation portion is operated to generate gas. The generated gas flows into the knee airbag stored in the folded state, and thus, the knee airbag is inflated. Thus, the knee airbag is inflated and deployed toward the knees of the occupant, and the knee airbag restrains and protects the knees of the occupant.

According to the first to third aspects of the invention, the airbag module is connected to the steering column by a simple action, and this makes it possible to very easily connect the airbag module to the steering column.

As described above, the knee airbag device according to the first to third aspects of the invention makes it possible to easily connect the airbag module to the steering column.

In the knee airbag device according to the second aspect of the invention, the airbag module may be snap-fitted to a bracket attached to the steering column.

Alternatively, in the knee airbag device according to the first aspect of the invention, the airbag module may be fitted to a bracket attached to the steering column by sliding the at least one fixing member.

Alternatively, in the knee airbag device according to the third aspect of the invention, the airbag module may be fixed to a bracket attached to the steering column by operating the at least one fixing mechanism one time, and may be released from the bracket by operating the at least one fixing mechanism one time.

As described above, if the bracket is attached to the steering column first, the steering lock may be attached to the steering column before the airbag module is fitted to the bracket, or the airbag module may be fitted to the bracket before the steering lock is attached to the steering column. In other words, there is no restriction on the procedure for connecting the airbag module and the steering lock to the steering column.

As described above, according to the aforementioned aspects, there is no restriction on the procedure for connecting the airbag module and the steering lock to the steering column, and this makes it possible to eliminate the need for making substantial changes in the existing sub-line process for the steering column.

In the knee airbag device according to the aforementioned aspects, the bracket may include at least one urging member. The knee airbag device may be designed so that a state of the at least one urging member is changed, by performing a predetermined operation, from a fixing state in which the airbag module is fixed to the bracket to a releasing state in which the airbag module is released from the bracket, and changed from the releasing state to the fixing state by performing the predetermined operation in a reverse order. When the at least one urging member is placed in the releasing state, the airbag module is placed at a position at which the airbag module is fitted to the bracket, and after the airbag module is placed at the position, the airbag module is fixed to the bracket by changing the state of the at least one urging member to the fixing state.

According to the aforementioned aspect, the bracket attached to the steering column includes the at least one urging member. With the at least one urging member, it is possible to fit and remove the airbag module to and from the bracket in the manner described below.

First, when the airbag module is fitted to the bracket, the urging member is placed in the releasing state by performing the predetermined operation. When the urging member is placed in the releasing state, the airbag module is set at the position at which the airbag module is fitted to the bracket. Because the urging member is placed in the releasing state, and thus the airbag module is not fixed to the bracket yet, the state of the urging member is changed from the releasing state to the fixing state by a simple action to fix the airbag module to the bracket.

On the other hand, when the airbag module is released from the bracket, the state of the urging member is changed from the fixing state to the releasing state by performing the predetermined operation in a reverse order. Thus, it is possible to release the airbag module from the bracket. In other words, ever after the airbag module is connected to the steering column (and even if the steering lock is already fitted to the steering column), it is possible to easily remove the airbag module from the steering column.

As described above, according to the aforementioned aspects, for example, when the airbag module needs be checked, it is possible to easily remove the airbag module from the steering column.

In the knee airbag device according to the aforementioned aspects, an airbag door, which is opened downward in a vehicle-height direction toward a rear of the vehicle when the knee airbag is inflated, may be integrated with the airbag module, and an opening portion, which is covered by the airbag door, may be formed in a lower surface of the column lower cover. Further, when the airbag module is connected to the steering column, a peripheral portion of the airbag door may be partially covered by a peripheral edge portion around an opening portion formed in the lower surface of the column lower cover so that the peripheral portion of the airbag door is supported by the peripheral edge portion around the opening portion formed in the lower surface of the column lower cover.

According to the aforementioned aspects, the airbag door, which is opened downward in a vehicle-height direction toward a rear of the vehicle when the knee airbag is inflated, is integrated with the airbag module. The peripheral portion of the airbag door is partially covered by the peripheral edge portion around an opening portion formed in the lower surface of the lower column cover when the airbag module is connected to the steering column. Therefore, an opening load of the airbag door is determined by an overlap area between the peripheral portion of the airbag door and the peripheral edge portion around the opening portion formed in the lower surface of the column lower cover. With this configuration, it is possible to relax requirement for production accuracy of the column lower cover, as compared to the configuration in which a tear line is provided in the column lower cover so that the column lower cover is torn along the tear line, and a portion of the column lower cover functions as the airbag door.

According to the aforementioned aspect, it is possible to relax requirement for the production accuracy of the column lower cover, thereby reducing the production cost accordingly.

The knee airbag device according to the first aspect of the invention may further include a cover that covers the column lower cover. In the knee airbag device, a module fitting opening portion, which is large enough for the airbag module to pass through, may be formed in a lower surface of the column lower cover, and the module fitting opening portion may be covered by the cover from outside the column lower cover.

According to the aforementioned aspect, the module fitting opening portion, which is large enough for the airbag module to pass through, is formed in the lower surface of the column lower cover, and this makes it possible to fix the column lower cover below the steering column before the airbag module is connected to the steering column. Then, the airbag module is connected to the steering column by a simple action through the module fitting opening portion, and then, the module fitting opening portion is closed by the cover, thereby completing the operation of connecting the knee airbag device.

In the knee airbag device according to the aforementioned aspect, it is possible to improve protection of the airbag module when the airbag module is housed in the column lower cover.

The knee airbag device according to the aforementioned aspect of the invention may further include a door portion that is manually opened and closed, and that is provided in a sidewall of the column lower cover.

According to the aforementioned aspect, the door portion that is manually opened and closed is provided in the sidewall of the column lower cover, and therefore it is possible to form an access hole by opening the door portion when the column lower cover is fixed below the steering column, and then the airbag module is connected to the steering column through the module fitting opening portion by a simple action. Further, it is possible to maintain good exterior appearance of the column lower cover by closing the door portion when the airbag module is connected to the steering column.

In the knee airbag device according to the aforementioned aspect, it is possible to maintain good exterior appearance of the column lower cover, and it is also possible to further easily connect the airbag module to the steering column.

According to a fourth aspect of the invention, a method of connecting a knee airbag device includes: attaching a bracket to a rear end portion of a steering column; snap-fitting an airbag module to the bracket so that the airbag module is disposed below the steering column; and fixing a column lower cover, which covers the rear end portion of the steering column from below, below the airbag module in a manner such that a peripheral portion of the airbag door is partially covered by a peripheral edge portion around an opening portion formed in a lower surface of the column lower cover, and fixing a column upper cover, which covers the rear end portion of the steering column from above, above the steering column. In the knee airbag device, the airbag module includes a gas generation portion that generates gas when the gas generation portion is operated, a knee airbag that is housed in the airbag module in a folded state and is inflated and deployed by the gas supplied from the gas generation portion, and an airbag door that is opened downward in a vehicle-height direction toward a rear of a vehicle by an inflation pressure of the knee airbag.

According to a fifth aspect of the invention, a method of connecting a knee airbag device includes: attaching a bracket to a rear end portion of a steering column; fitting an airbag module to the bracket by sliding at least one fixing member that fixes the airbag module to the bracket so that the airbag module is disposed below the steering column; and fixing a column lower cover, which covers the rear end portion of the steering column from below, below the airbag module in a manner such that a peripheral portion of the airbag door is partially covered by a peripheral edge portion around an opening portion formed in a lower surface of the column lower cover, and fixing a column upper cover, which covers the rear end portion of the steering column from above, above the steering column. In the knee airbag device, the airbag module includes a gas generation portion that generates gas when the gas generation portion is operated, a knee airbag that is housed in the airbag module in a folded state and is inflated and deployed by the gas supplied from the gas generation portion, and an airbag door that is opened downward in a vehicle-height direction toward a rear of a vehicle by an inflation pressure of the knee airbag.

According to a sixth aspect of the invention, a method of connecting a knee airbag device includes: attaching a bracket to a rear end portion of a steering column; fitting an airbag module to the bracket by operating at least one fixing mechanism one time so that the airbag module is disposed below the steering column, wherein the at least one fixing mechanism removably fixes the airbag module to the bracket; and fixing a column lower cover, which covers the rear end portion of the steering column from below, below the airbag module in a manner such that a peripheral portion of the airbag door is partially covered by a peripheral edge portion around an opening portion formed in a lower surface of the column lower cover, and fixing a column upper cover, which covers the rear end portion of the steering column from above, above the steering column. In the knee airbag device, the airbag module includes a gas generation portion that generates gas when the gas generation portion is operated, a knee airbag that is housed in the airbag module in a folded state and is inflated and deployed by the gas supplied from the gas generation portion, and an airbag door that is opened downward in a vehicle-height direction toward a rear of a vehicle by an inflation pressure of the knee airbag.

According to the aforementioned methods, it is possible to fit the airbag module to the bracket attached to the steering column, by a simple action. Further, by fixing the column lower cover in a manner such that the outer peripheral portion of the airbag door, which is previously attached to the airbag module, is partially covered by the peripheral edge portion around the opening portion formed in the column lower cover, the column lower cover is positioned with respect to the airbag module. Thus, the operation of fixing the column lower cover is easily performed.

As described above, the method of connecting the knee airbag device according to the aforementioned aspects makes it possible to easily connect the airbag module to the steering column, and further, easily fix the column lower cover below the steering column.

According to a seventh aspect of the invention, a method of connecting a knee airbag device includes: attaching a bracket to a rear end portion of a steering column; fixing a column lower cover, whose lower surface includes a module fitting opening portion that is large enough for an airbag module to pass through, below the rear end portion of the steering column; snap-fitting the airbag module to the bracket trough the module fitting opening portion; and fitting a cover to the column lower cover from outside the column lower cover so that the module fitting opening portion of the column lower cover is closed by the cover. In the knee airbag device, the airbag module includes a gas generation portion that generates gas when the gas generation portion is operated, and a knee airbag that is housed in the airbag module in a folded state and is inflated and deployed by the gas supplied from the gas generation portion.

According to an eighth aspect of the invention, a method of connecting a knee airbag device includes: attaching a bracket to a rear end portion of a steering column; fixing a column lower cover, whose lower surface includes a module fitting opening portion that is large enough for an airbag module to pass through, below the rear end portion of the steering column; fitting the airbag module to the bracket by sliding at least one fixing member that fixes the airbag module to the bracket through the module fitting opening portion; and fitting a cover to the column lower cover from outside the column lower cover so that the module fitting opening portion of the column lower cover is closed by the cover. In the knee airbag device, the airbag module includes a gas generation portion that generates gas when the gas generation portion is operated, and a knee airbag that is housed in the airbag module in a folded state and is inflated and deployed by the gas supplied from the gas generation portion.

According to a ninth aspect of the invention, a method of connecting a knee airbag device includes: attaching a bracket to a rear end portion of a steering column; fixing a column lower cover, whose lower surface includes a module fitting opening portion that is large enough for an airbag module to pass through, below the rear end portion of the steering column; fitting the airbag module to the bracket by operating at least one fixing mechanism one time through the module fitting opening portion, wherein the fixing mechanism removably fixes the airbag module to the bracket; and fitting a cover to the column lower cover from outside the column lower cover so that the module fitting opening portion of the column lower cover is closed by the cover. In the knee airbag device, the airbag module includes a gas generation portion that generates gas when the gas generation portion is operated, and a knee airbag that is housed in the airbag module in a folded state and is inflated and deployed by the gas supplied from the gas generation portion.

According to the seventh to ninth aspects of the invention, it is possible to fit the airbag module to the bracket by a simple action, after the column lower cover is fixed below the steering column.

As described above, the method of connecting the knee airbag device according to the seventh to ninth aspects of the invention makes it possible to easily connect the airbag module to the steering column.

In the method of connecting a knee airbag device according to the seventh to the ninth aspects of the invention, a door portion that is manually opened and closed may be provided in a sidewall of the column lower cover, and the door portion may be opened when the airbag module is fitted to the bracket, and closed after the airbag module is fitted to the bracket.

According to the aforementioned aspect, the door portion that is manually opened and closed is provided in the sidewall of the column lower cover, and therefore it is possible to form an access hole by opening the door portion when the airbag module is fitted to the bracket. Then, the door portion is closed after the airbag module is fitted to the bracket.

As described above, the method of connecting the knee airbag device according to the aforementioned aspects of the invention makes it possible to further easily connect the airbag module to the steering column.

According to a tenth aspect of the invention, the knee airbag device includes: a column lower cover that covers a rear end portion of a steering column from below; a column upper cover that is fitted to the column lower cover and covers the rear end portion of the steering column from above; and an airbag module that is disposed inside the column lower cover when the airbag module is connected to the steering column. The airbag module includes a gas generation portion that generates gas when the gas generation portion is operated, and a knee airbag that is housed in the airbag module in a folded state and is inflated and deployed by the gas supplied from the gas generation portion. In the knee airbag device, the airbag module is fixed below the rear end portion of the steering column. The column lower cover is fixed to the airbag module by hooking the column lower cover to the airbag module from below, and is fitted to the column upper cover through engagement between the column lower cover and the column upper cover.

According to the aforementioned aspect, the column lower cover may be fitted to the column upper cover by one action.

According to the aforementioned aspect of the invention, when the vehicle has a collision with a collision object, the gas generation portion is operated to generate gas. The generated gas flows into the knee airbag stored in the folded state, and thus, the knee airbag is inflated. Thus, the knee airbag is inflated and deployed toward the knees of the occupant, and the knee airbag restrains and protects the knees of the occupant.

According to the aforementioned aspect, it is possible to fix the column lower cover to the airbag module by hooking the column lower cover to the airbag module from below, and fit the column lower cover to the column upper cover through engagement between the column lower cover and the column upper cover. This makes it possible to very easily fit the column lower cover to the airbag module and the column upper cover.

As described above, the knee airbag device according to the aforementioned aspect of the invention makes it possible to easily fix the column lower cover below the steering column.

According to an eleventh aspect of the invention, a method of connecting a knee airbag device includes: attaching a bracket to a rear end portion of a steering column; fitting an airbag module to the bracket; and engaging a column lower cover, which covers the rear end portion of the steering column from below, with at least one engagement portion provided in the airbag module, and fitting the column lower cover to a column upper cover, which covers the rear end portion of the steering column from above, through engagement between the column lower cover and the column upper cover. In the knee airbag device, the airbag module includes a gas generation portion that generates gas when the gas generation portion is operated, and a knee airbag that is housed in the airbag module in a folded state and is inflated and deployed by the gas supplied from the gas generation portion.

As described above, the method of connecting the knee airbag device according to the aforementioned aspect makes it possible to easily fix the column lower cover below the steering column, because it is possible to engage the column lower cover with the engagement portion provided in the airbag module by one action, and fit the column lower cover to the column upper cover by one action through engagement between the column lower cover and the column upper cover.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein:

FIG. 3A is a partially enlarged plan view showing a spring member in a releasing state;

FIG. 5 is a partially exploded perspective view showing a comparison example, FIG. 5 corresponding to FIG. 1;

DETAILED DESCRIPTION OF THE PREFERRED EMBODIMENTS

First Embodiment

Hereinafter, a knee airbag device according to a first embodiment of a knee airbag device and a connecting method thereof will be described with reference to FIG. 1 to FIG. 5. In FIG. 1 to FIG. 5, the arrow FR indicates the front of a vehicle. The arrow UP indicates the top of the vehicle. The arrow IN indicates the inside of a vehicle in a vehicle-width direction.

Figure 1:
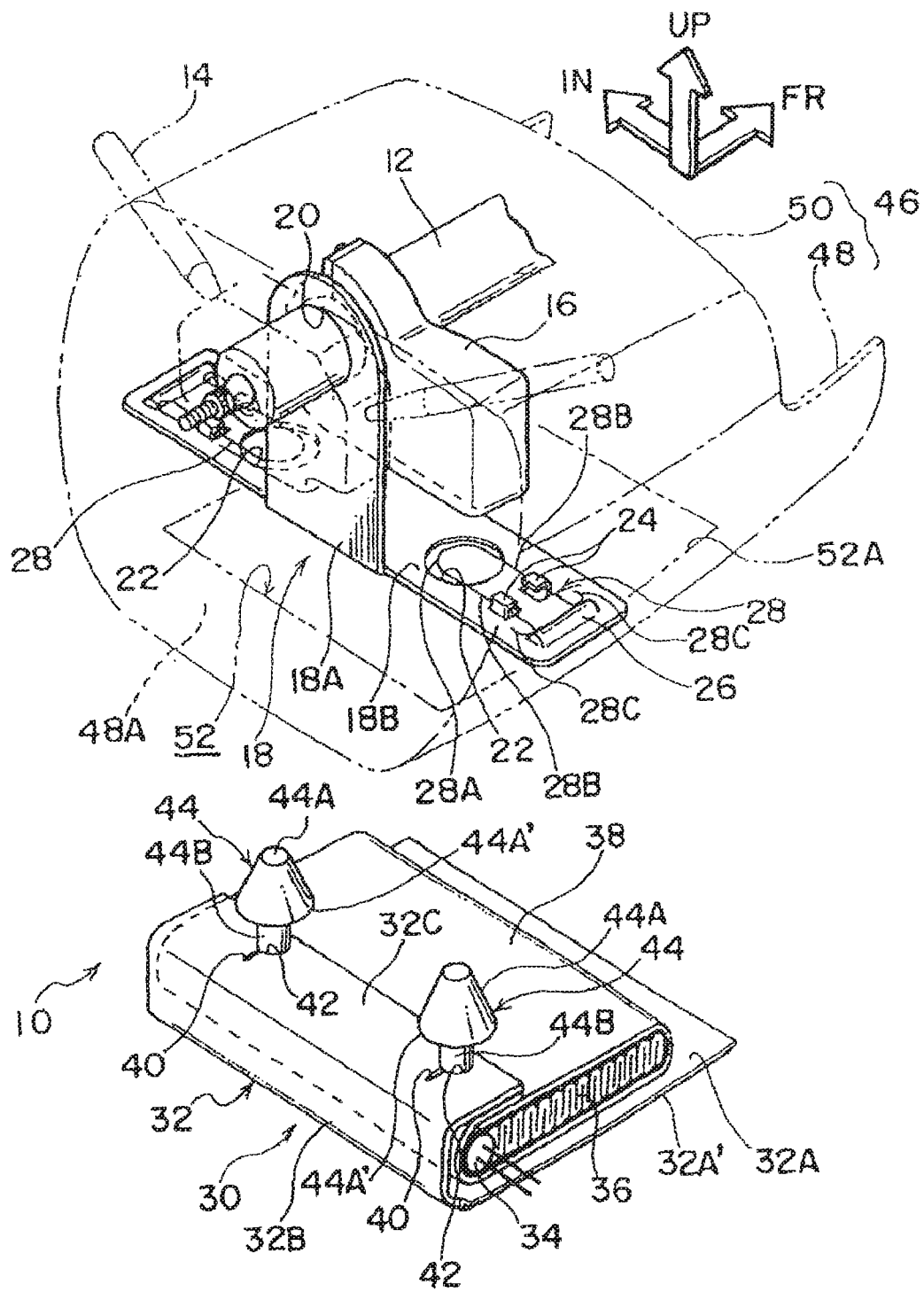
FIG. 1 is a partially exploded perspective view showing an entire configuration of a knee airbag device and a connecting method thereof according to a first embodiment.
Figure 2:
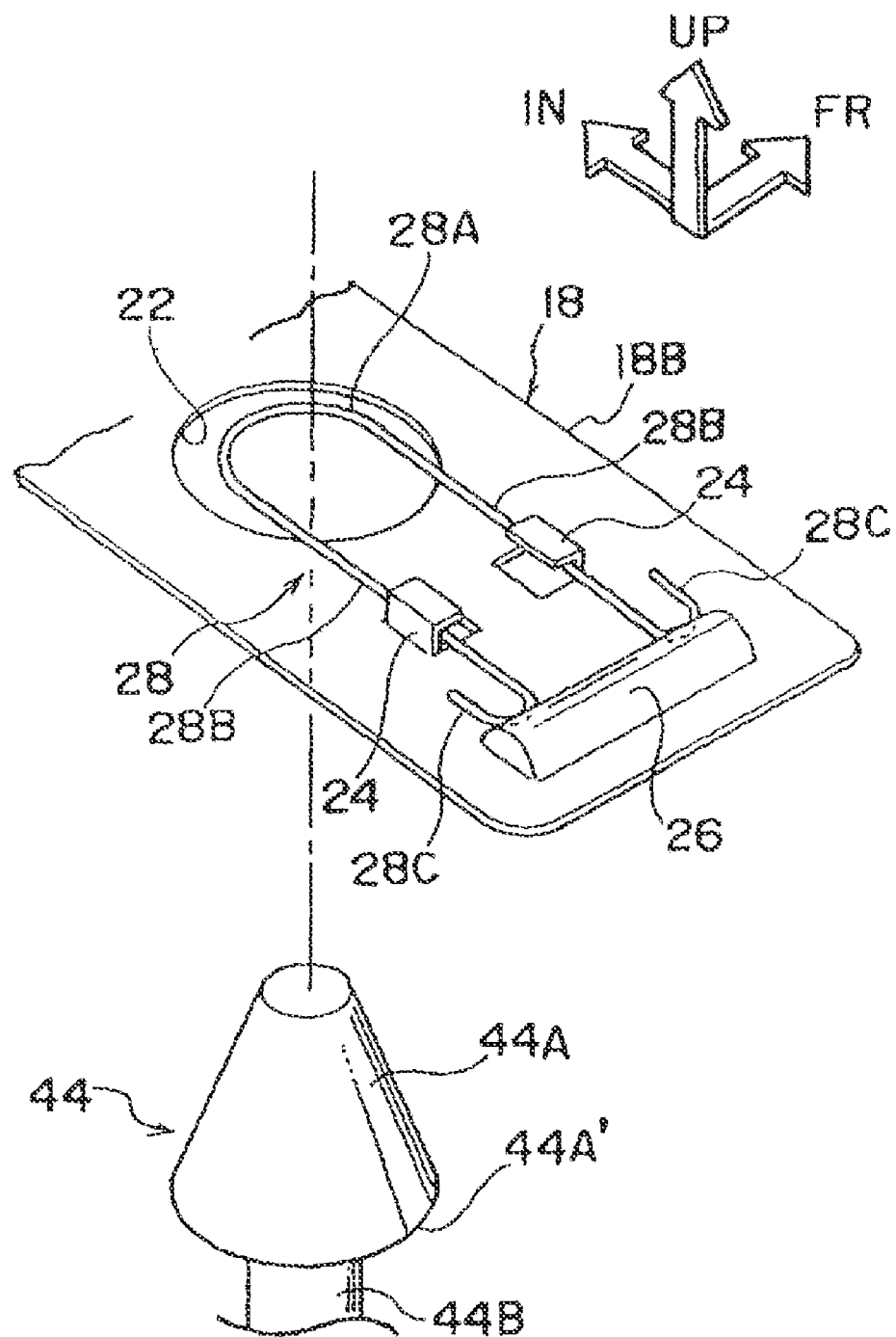
FIG. 2 is an enlarged perspective view of a main portion, which shows an airbag module and a bracket when a fitting portion of the airbag module is not inserted through a fitting hole of the bracket.

FIG. 1 is a partially exploded view showing an entire configuration of a knee airbag device 10 according to the first embodiment. As shown in FIG. 1, a knee airbag device 10 is disposed below a rear end portion of a steering column 12. A combination switch 14 is disposed on the rear end portion of the steering column 12. Further, a steering lock 16 that projects outward in a vehicle-width direction is disposed at a position ahead of the combination switch 14 in the direction of the axis of the steering column 12 with a predetermined space therebetween.

A bracket 18 is disposed between the combination switch 14 and the steering lock 16 disposed on the steering column 12. The bracket 18 includes an upper bracket portion 18A that extends perpendicular to an axial direction, of the steering column 12, and a lower bracket portion 18B that extends in parallel with the axial direction of the steering column 12, from a lower edge of the upper bracket portion 18A. That is, the bracket 18 is L-shaped in a side view. The bracket 18 is made of metal, and the upper bracket portion 18A includes a circular through hole 20. The steering column 12 is inserted through the insertion hole 20 and welded to the insertion hole 20, so that the bracket 18 is fixed to the rear end portion of the steering column 12 at a predetermined position.

The lower bracket portion 18B is configured to be a rectangular flat plate when viewed from above the steering column 12. The lower bracket portion 18B projects for a predetermined length from the steering column 12 in the vehicle-width direction, when viewed from above the steering column 12. Further, a pair of right and left fitting holes 22 is formed in the lower bracket 18b at positions on the sides of the steering column 12. A pair of front and rear hook-shaped nail portions 24 stands outside each of the fitting holes 22 in the vehicle-width direction so that the nail portions 24 face each other in a longitudinal direction of the vehicle. The nail portions 24 are formed by means of cutting and bending. Further, a raised portion 26 in a linear shape is formed outside each pair of the nail portions 24 in the vehicle-width direction. The raised portion 26 is formed by means of embossing. The raised portion 26 is formed in parallel with an outer edge of the lower bracket portion 18B in the vehicle-width direction, and is slightly longer than the distance between the pair of the nail portions 24. The raised portion 26 is raised upward toward the steering column 12, and has a hemispherical cross-section.

The bracket 18 is provided with a pair of right and left spring members 28. The right and left spring member 28 function as urging members, and correspond to the right and left fitting holes 22, respectively. Each of the spring members 28 is formed by a wire, and has a substantially mountain shape when the spring member 28 is in a natural state. Further, each of the spring members 28 includes a curved top portion 28A, a pair of leg portions 2813, and a pair of folded portions 28C. The top portion 28A has an arc shape. The leg portions 2813 extend from the top portion 28A to form oblique sides of the mountain-shaped spring member 28. The folded portions 28C are formed by folding edge portions of the leg portions 28B in U-shape.

The leg portions 28B of each spring member 28 are engaged, in an elastically deformed state, with the front and rear nail portions 24 provided on the bracket 18. Therefore, the spring member 28 has elastic restoring force that acts in a direction in which the leg portions 28B are separated from each other. Further, when the leg portions 28B are engaged with the respective nail portions 24, the leg portions 28B are disposed in substantially parallel with each other, and the top portion 28A is movable with respect to the fitting hole 22, in a direction indicated by an arrow A shown in FIG. 3A. A moving stroke of the spring member 28 with respect to the fitting hole 22 is set to a distance between a releasing position (shown in FIG. 3A) at which the folded portions 28C are engaged with the respective nail portions 24 and a fixing position (shown in FIG. 3B) at which the folded portions 28C abut the raised portion 26. Further, when the spring member 28 is slid toward the releasing position, the top portion 28A of the spring member 28 radially expands so that the top portion 28A overlaps with a peripheral edge portion around the fitting hole 22 (see FIG. 3A).

The knee airbag device 10 fitted to the aforementioned bracket 18 includes, as main components, an airbag module 30 that constitutes a main body portion of the knee airbag device 10, and an airbag door 32 that covers a lower surface of the airbag module 30.

The airbag module 30 includes an inflator 34 that functions as a gas generation portion disposed below the rear end portion of the steering column 12 when the airbag module 30 is connected to the steering column 12, and a knee airbag 36 disposed in a folded state at a position ahead of the inflator 34. The inflator 34 is substantially cylinder-shaped, and the inflator 34 is disposed in a manner such that the longitudinal direction of the inflator 34 matches the vehicle-width direction. It should be noted that the inflator 34 may be a gas cylinder that contains high-pressure gas. Alternatively, the inflator 34 may contain a gas generation agent that generates gas when burned. Further, the knee airbag 36 is accordion-folded. However, the knee airbag 36 need not necessarily be accordion-folded. The knee airbag 36 may be rolled up. Alternatively, a portion of the knee airbag 36 may be accordion-folded, and another portion of the knee airbag 36 may be rolled up. The inflator 34 and the folded knee airbag 36 provided in the airbag module 30 are covered by a protective cloth 38 to maintain the shape.

The airbag door 32 includes a door main body 32A disposed under a lower surface of the airbag module 30, a hinge portion 32B standing from a rear edge of the door main body 32A along the inflator 34, an upper surface portion 32C that extends from an upper edge of the hinge portion 32B toward a front side of the vehicle for a predetermined length. The upper surface portion 32C of the airbag door 32 includes a pair of insertion holes 42 with respective slits 40. A pair of left and right fitting portions 44 (which will be described later) is inserted through the pair of insertion holes 42.

Figure 3B:
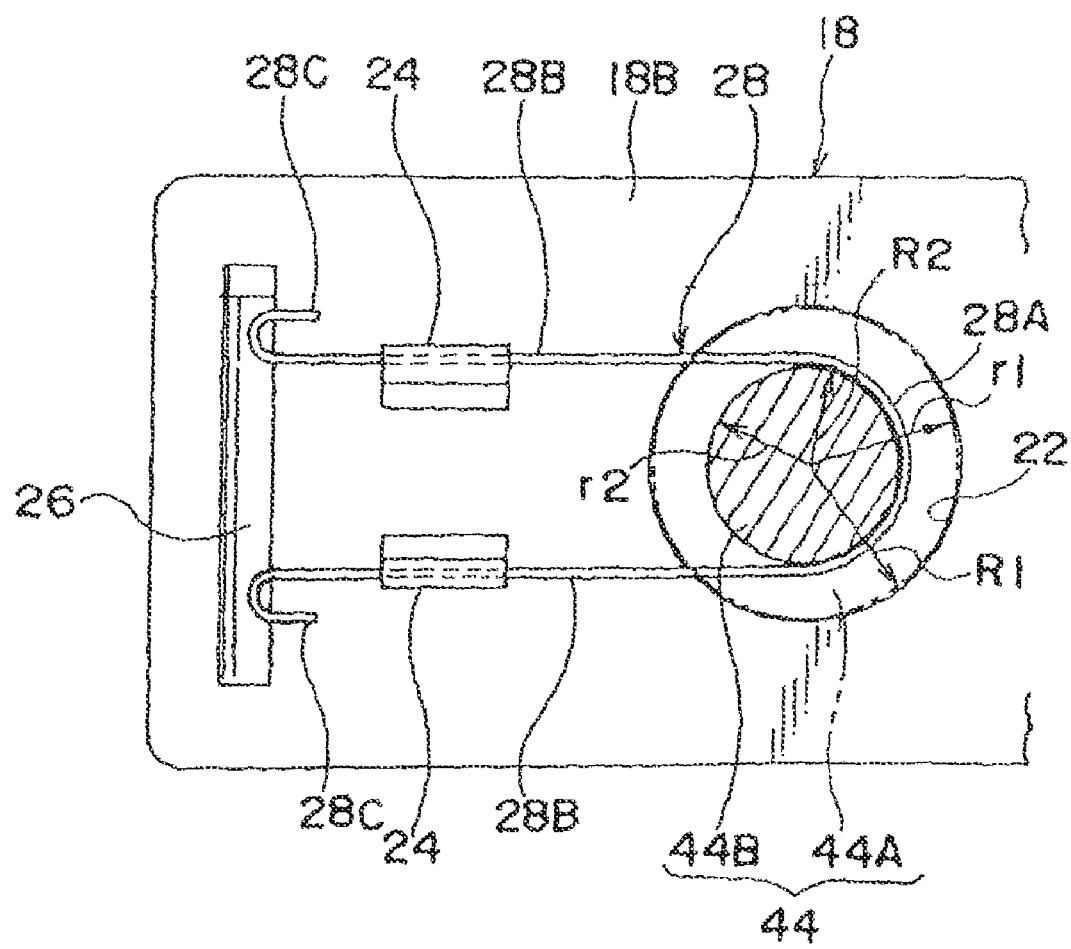
FIG. 3B is a partially enlarged plan view showing the spring member in a fixing state.

The left and right umbrella-shaped fitting portions 44 stand on an upper portion of an outer periphery of the inflator 34 when the airbag module 30 is connected to the steering column 12. Each of the fitting portions 44 includes a protrusion portion 44A that has a substantially circular cone shape with a flat top surface and that protrudes in a substantially umbrella shape toward the steering column 12, and a neck portion 44B that is a straight stick member, and that is disposed at an axial center of the protrusion portion 44A. As shown in FIG. 3B, an outer peripheral radius r1 of a lower end portion 44A' of the protrusion portion 44A is set to be slightly smaller than an inner peripheral radius R1 of the fitting hole 22, and is set to be larger than an inner peripheral radius R2 of the top portion 28A of the spring member 28 in the fixing state. Further, an outer peripheral radius r2 of the neck portion 44B is set to be slightly smaller than the inner peripheral radius R2 of the top portion 28A of the spring member 28 in the fixing state. In the first embodiment, the outer peripheral radius r2 of the neck portion 44B is set to be slightly smaller than the inner peripheral radius R2 of the top portion 28A of the spring member 28. However, the inner peripheral radius R2 of the top portion 28A of the spring member 28 may be set to be substantially equal to the outer peripheral radius r2 of the neck portion 44B.

Figure 4:
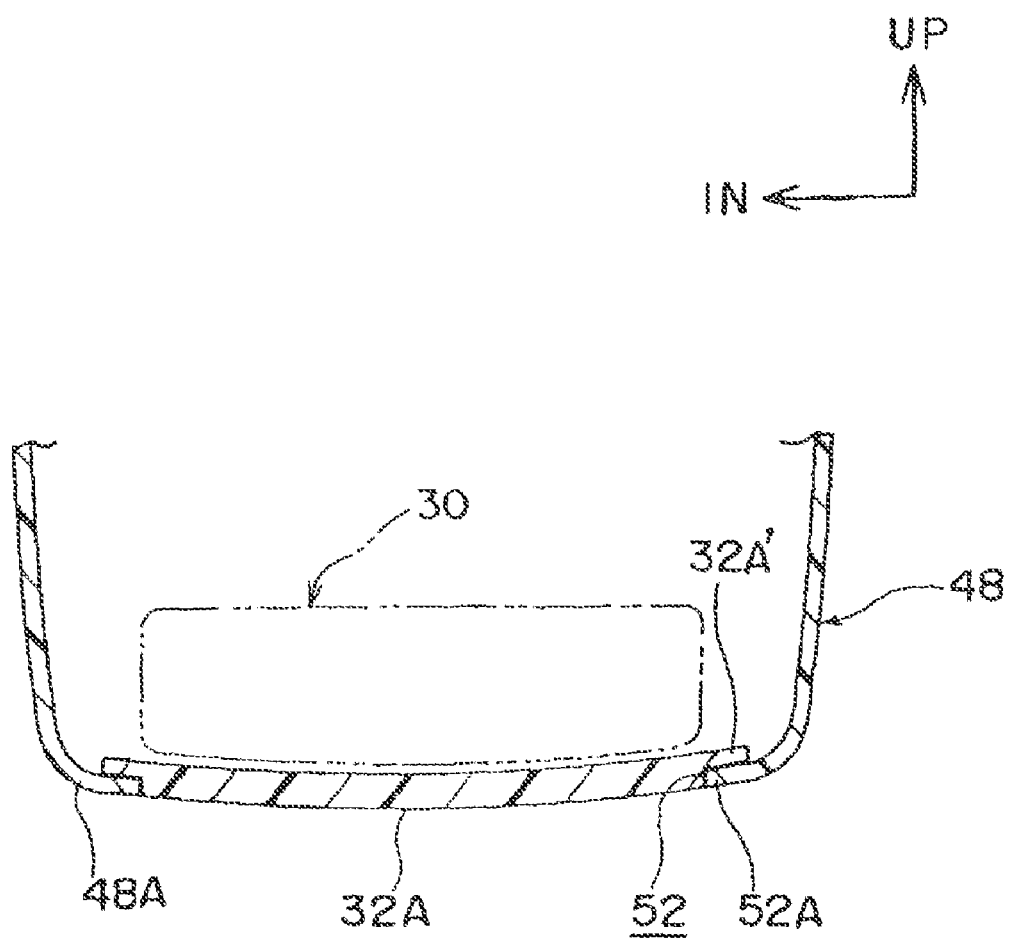
FIG. 4 is a sectional view taken along a vehicle-width direction, which shows an airbag door and a column lower cover that are engaged with each other when the airbag module is connected to a steering column.

As shown in FIG. 1, the aforementioned airbag module 30 is covered by a column cover 46 that covers the rear end portion of the steering column 12. The column cover 46 is made of resin, and is divided into two portions, i.e., an upper portion and a lower portion. More specifically, the column cover 46 includes a column upper cover 50 and a column lower cover 48. An opening portion 52 in a rectangular shape is formed in a lower surface 48A of the column lower cover 48, and the size of the opening portion 52 is substantially equal to the size of the door main body 32A of the aforementioned airbag door 32. As shown in FIG. 4, the door main body 32A of the airbag door 32 includes an outer peripheral portion 32A' that is stepped so that the stepped outer peripheral portion 32A' is engaged with a peripheral edge portion 52A around the opening portion 52. The stepped outer peripheral portion 32A' of the door main body 32A is configured so that when the column lower cover is fixed, the peripheral edge portion 52A around the opening portion 52 formed in the lower surface 48A of the column lower cover 48 supports the outer peripheral portion 32A' of the door main body 32A from below.

[Advantageous effects obtained in the embodiment] Next, a method of connecting the knee airbag device 10 according to the embodiment to a vehicle will be described. In the description of the method, the advantageous effects obtained in the embodiment will be described.

First, in a bracket attachment process, the bracket 18 is attached to the rear end portion of the steering column 12 at a predetermined position. More specifically, the right and left spring members 28 are previously attached to the bracket 18. Next, the rear end portion of the steering column 12 is inserted through the through hole 20 formed in the upper bracket portion 18A, and a peripheral edge of the through hole 20 of the upper bracket portion 18A is fixed to the outer peripheral surface of the steering column 12 at a predetermined position of the steering column 12, for example, by welding.

Next, in a module fitting process, the airbag module 30 as shown in FIG. 1 is fitted to the bracket 18 by a snap-fit action. More specifically, the spring members 28 attached to the bracket 18 are placed in the releasing state (that is, the state indicated by the solid line in FIG. 3A). In other words, each of the spring members 28 is slid inward in the vehicle-width direction until the folded portions 28C of the spring member 28 are engaged with the respective nail portions 24. In this state, the top portion 28A of the spring member 28 is expanded outward in a manner such that the top portion 28A substantially overlaps with the inner peripheral edge of the fitting hole 22. In this state, each of the fitting portions 44 of the airbag module 30 is inserted through the corresponding fitting hole 22 and through the top portion 28A of the corresponding spring member 28. Then, the spring member 28 is slid until the folded portions 28C of the spring member 28 abut the raised portion 26 of the bracket 18 using the elastic restoring force of the expanded top portion 28A. Thus, the spring member 28 is placed in the fixing state as shown by the chain double-dashed line in FIG. 3A, and the top portion 28A of the spring member 28 is engaged with the neck portion 44B of the corresponding fitting portion 44 (in other words, the umbrella-shaped protrusion portion 44A of the fitting portion 44 is caught between the pair of the leg portions 28B of the spring member 28 and cannot pass through the fitting hole 22). Consequently, the fitting portions 44 cannot be removed from the spring members 28, and thus, the airbag module 30 is fixed to the bracket 18.

Next, in a column cover fitting process, the column upper cover 50 is fixed above the rear end portion of the steering column 12, and then the column lower cover 48 is fixed to the column upper cover 50 from below the steering column 12 to complete the column cover 46. Because the airbag door 32 is attached to the airbag module 30 that is fitted to the bracket 18 prior to this column cover fitting process, the column lower cover 48 is fitted to the airbag module 30 in a manner such that the outer peripheral portion 32A' of the airbag door 32 is engaged with the peripheral edge portion 52A around the opening portion 52 formed in the column lower cover 48, and thus the airbag door 32 is partially covered by the column, lower cover 48, as shown in FIG. 4.

The steering lock 16 may be fitted to the steering column 12 after the bracket 18 is fixed to the steering column 12, or may be fitted to the steering column 12 after the airbag module 30 is fitted to the bracket 18.

For example, if an electrical system failure occurs in the airbag module 30 that is connected to the steering column 12 in a manner described above, and a warning message appears on a display portion, such as a meter cluster panel, a driver of the vehicle brings the vehicle to an auto service shop, etc. for a checkup of the airbag module 30. When a mechanic performs a checkup of the airbag module 30, it is possible for the mechanic to easily remove the airbag module 30 from the steering column 12 by following the aforementioned fitting procedure in a reverse order. That is, it is possible to easily remove the airbag module 30 from the bracket 18 only by changing the state of the spring members 28 from the fixing state to the releasing state.

When the vehicle, in which the knee airbag device 10 is provided in the above-described processes, has a frontal collision (or when it is predicted that the vehicle will have a frontal collision), a collision detection device (not shown) determines that the vehicle has a frontal collision (or predicts that the vehicle will have a frontal collision), and outputs a detection signal to an airbag ECU. When the airbag ECU determines that airbag devices should be operated, a driver seat airbag device is operated to inflate a driver seat airbag on the steering wheel, and the knee airbag device 10 is operated. That is, a predetermined current is supplied to the inflator 34 of the knee airbag device 10, and thus, the inflator 34 is operated. As a result, the inflator 34 generates gas, and the gas is supplied to the knee airbag 36 stored in the folded state, and thus the knee airbag 36 is inflated. When the inflation pressure of the knee airbag 36, which is applied to the airbag door 32, reaches a predetermined value, the outer peripheral portion 32A' of the airbag door 32 is detached (i.e. disengaged) from the peripheral edge portion 52A around the opening portion 52 formed in the column lower cover 48, and thus, the airbag door 32 is opened downward toward the rear of the vehicle. As a result, the knee airbag 36 is inflated and deployed toward the area below the steering column 12 and the areas on the sides of the steering column 12. Thus, right and left side portions, which are disposed between an instrument panel and the knees of the occupant, receive and protect the knees of the occupant.

As described above, in the knee airbag device 10 according to the first embodiment, the bracket 18 is previously fixed to the rear end portion of the steering column 12 at the predetermined position, and then the airbag module 30 is fitted to the bracket 18 by the snap-fit action. Therefore, the operation of fitting the airbag module is substantially simplified. Consequently, according to the first embodiment, it is possible to easily connect the airbag module 30 to the steering column 12.

As a comparison, FIG. 5 shows how an airbag module 62 is fitted, by bolts and nuts, to a bracket 60 that is previously fixed to the steering column 12. As shown in FIG. 5, if the steering lock 16 is fitted to the rear end portion of the steering column 12 prior to the fitting of the airbag module 62, the steering lock 16 overlaps with a position at which the airbag module 62 is fastened to the bracket 60 in a plan view. Therefore, although it is possible to fasten a left nut 64 to a left bolt 66, it is not possible to fasten a right nut 68 to a right bolt 70 in FIG. 5. Therefore, after the bracket 60 is fixed to the steering column 12, the bolts 66, 70 of the airbag module 62 are inserted through respective bolt insertion holes 72, 74 formed in the bracket 60 and the nuts 64, 68 are fastened to the bolts 66, 70, respectively, and then, the steering lock 16 is fitted to the steering column 12. Thus, there is a restriction on the fitting procedure. Also, the operation of fastening the bolts is complicated, requiring use of some kind of tools. Furthermore, once the steering lock 16 is fixed to the steering column 12, the airbag module 62 cannot be removed from the steering column 12 because of the steering lock 16.

Compared to the aforementioned bolt-fastened airbag module 62, such difficulty in the fitting procedure is eliminated, and it is possible to easily connect the airbag module 30 to the steering column 12, according to the first embodiment. Furthermore, for example, when the checkup of the airbag module 30 is performed, it is possible to easily remove the airbag module 30 from the steering column 12 only by sliding the spring members 28 to change the state of the spring member 28 from the fixing state to the releasing state. Therefore, it is no longer necessary to perform troublesome processes, such as removal of the entire steering column 12 from the vehicle. Further, as described above, because there is no restriction on the procedure for fitting the airbag module 30 and the steering lock 16, it is not necessary to drastically change the procedure in the existing sub-line process.

According to the first embodiment, the airbag door 32 is previously integrated with the airbag module 30. Then, when the column lower cover 48 is fixed, the outer peripheral portion 32A' of the airbag door 32 is engaged with the peripheral edge portion 52A around the opening portion 52 formed in the lower surface 48A of the column lower cover 48 in a manner such that the outer peripheral portion 32A' is partially covered by the peripheral edge portion 52A. Therefore, an opening load of the airbag door 32 is determined by an overlap area between the outer peripheral portion 32A' of the airbag door 32 and the peripheral edge portion 52A around the opening portion 52 formed in the column lower cover 48. With this configuration, it is possible to relax requirement for production accuracy of the column lower cover 48, as compared to the configuration in which a tear line is provided in the column lower cover so that the column lower cover is torn along the tear line, and a portion of the column lower cover functions as the airbag door. As a result, it is possible to reduce production cost of the column lower cover 48 due to the relaxed requirement for production accuracy.

Further, according to the first embodiment, in the module fitting process, the airbag module 30 is fitted to the bracket 18. Then, in the column cover fitting process, the column upper cover 50, which covers the rear end portion of the steering column 12 from above, is fixed above the steering column 12. Then, the column lower cover 48 is fixed below the airbag module 30 in a manner such that the outer peripheral portion 32A' of the airbag door 32 is partially covered by the peripheral edge portion 52A around the opening portion 52 formed in the column lower cover 48. Therefore, by fixing the column lower cover 48 in a manner such that the outer peripheral portion 32A' of the airbag door 32 is partially covered by the peripheral edge portion 52A around the opening portion 52 formed in the column lower cover 48, the column lower cover 48 is positioned with respect to the airbag module 30. Thus, the operation of fixing the column lower cover 48 is easily performed. As a result, according to the first embodiment, it is possible to easily connect the airbag module 30 to the steering column 12, and easily fix the column lower cover 48 below the airbag module 30.

Second Embodiment

Hereinafter, a second embodiment of the invention will be described with reference to FIG. 6. The same and corresponding portions as those of the configuration in the first embodiment are denoted by the same reference numerals, and the description thereof will be omitted.

Figure 6:
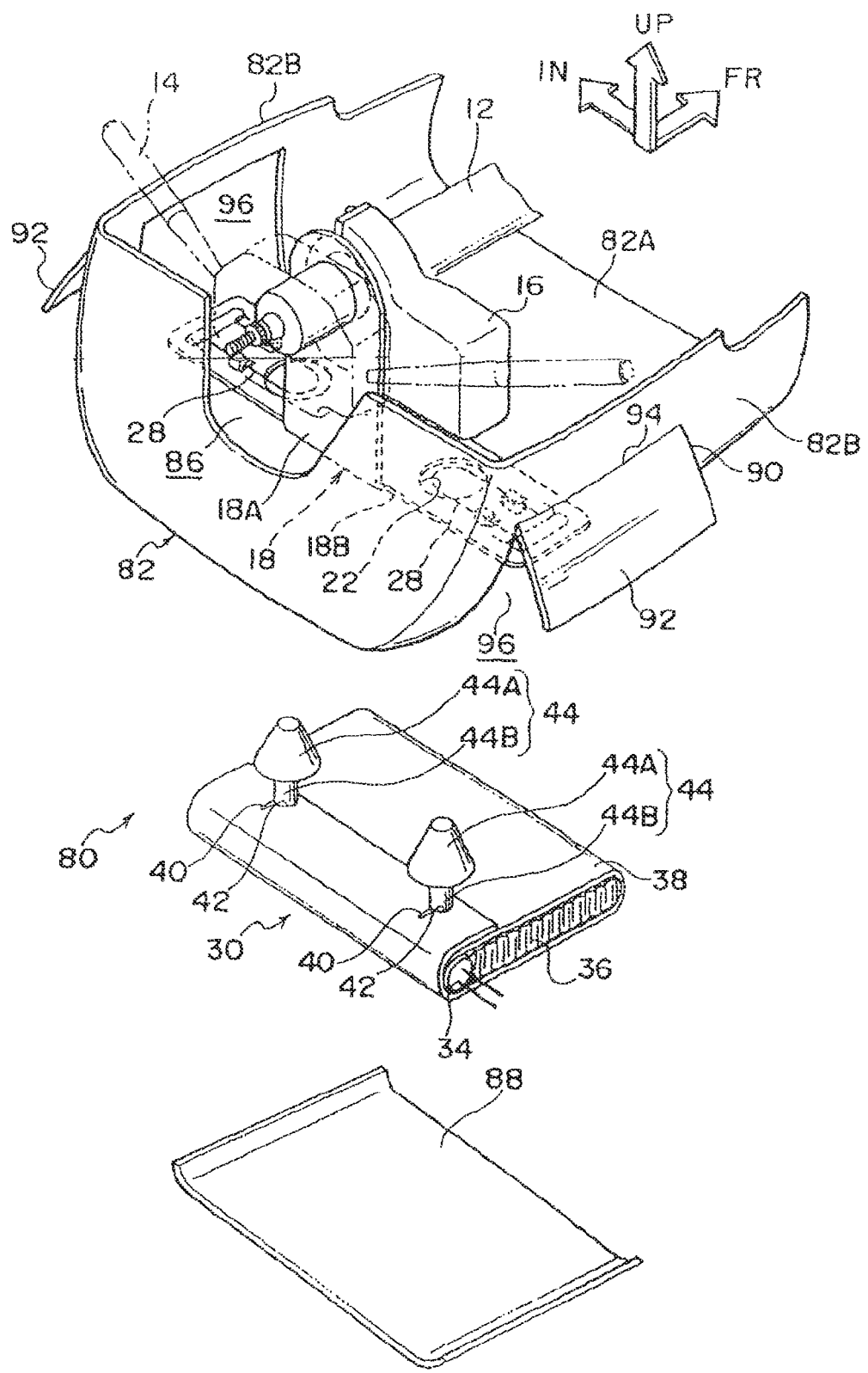
FIG. 6 is a partially exploded perspective view showing an entire configuration of a knee airbag device and a connecting method thereof according to a second embodiment.

As shown in FIG. 6, in a knee airbag device 80 according to the second embodiment, a module fitting opening portion 86, which is large enough for the airbag module 30 to pass through, is formed in a lower surface 82A of a column lower cover 82. The module fitting opening portion 86 is covered by a cover 88 that is formed separately from the column lower cover 82. The cover 88 and the column lower cover 82 are connected by a strap (not shown) or the like that functions as a hinge when the knee airbag 36 is deployed. Further, nails (not shown) are provided at predetermined positions on four sides of an outer periphery of the cover 88 and at predetermined positions in a peripheral edge portion around the module fitting opening portion 86, and thus, the cover 88 is engaged with the column lower cover 82 through engagement of these nails.

The column lower cover 82 includes right and left sidewalls 82B, and each of the sidewalls 82B includes a door portion 92 defined by a parting line 90 that extends in a substantially U shape in a side view. The door portions 92 are opened and closed around the respective hinges 94 when necessary.

It should be noted that the airbag module 30 is basically configured in the same manner as in the first embodiment. However, the airbag module 30 according to the second embodiment is not provided with the airbag door 32 provided in the first embodiment.

(Advantageous effects obtained in the embodiment) According to the aforementioned configuration, it is possible to connect the airbag module 30 to the steering column 12 in a manner described below.

First, in the bracket attachment process, the bracket 18 is attached to the rear end portion of the steering column 12. Then, in the column lower cover fitting process, the column lower cover 82 is fixed below the rear end portion of the steering column 12. Next, the airbag module 30 is inserted through the module fitting opening portion 86 formed in the lower surface 82A of the column lower cover 82, and the airbag module 30 is fitted to the bracket 18 by the snap-fit action as described above.

At this time, the door portions 92 formed in the sidewalls 82B of the column lower cover 82 are opened outward in the vehicle-width direction. Access holes 96 are formed in the sidewalls 82B of the column lower cover 82 by opening the door portions 92, and thus it is possible to easily fit the airbag module 30 to the bracket 18 by the snap-fit action. After the airbag module 30 is fitted to the bracket 18, the right and left door portions 92 are closed, and thus, placed in an original state.

Then, as the final step, the module fitting opening portion 86 of the column lower cover 82 is closed by the cover 88.

As described above, according to the second embodiment, it is possible to fit the airbag module 30 to the bracket 18 by the snap-fit action after the column lower cover 82 is fixed below the steering column 12. In other words, the fitting procedure according to the second embodiment is a reverse procedure to the fitting procedure according to the first embodiment. Generally, if the column lower cover is fixed below the steering column before the airbag module is connected to the steering column, the operation of connecting the airbag module to the steering column tends to be complicated. However, according to the second embodiment of the invention, the door portions 92, which are opened and closed, are provided in the sidewalls 82B of the column lower cover 82, and the access holes 96 are formed by opening the door portions 92. Therefore, it is possible to easily connect the airbag module 30 to the steering column 12. Furthermore, because the door portions 92 are closed after the airbag module 30 is fitted to the bracket 18, it is possible to maintain good exterior appearance of the column lower cover 82.

Further, according to the second embodiment, the module fitting opening portion 86 formed in the lower surface 82A of the column lower cover 82 is closed by the cover 88. With this configuration, it is possible to improve protection of the airbag module 30 when the airbag module 30 is housed in the column lower cover 82. It is a possible option to omit the cover 88 and leave the module fitting opening portion 86 uncovered because the airbag module 30 is covered by the protective cloth 38. However, in this case, the protective cloth 38 is exposed to outside through the module fitting opening portion 86, and this may result in damaging the protective cloth 38 or accelerating deterioration of the protective cloth 38. According to the second embodiment, however, because the cover 88 closes the module fitting opening portion 86, it is possible to protect the airbag module 30 (in particular, the knee airbag 36) from potential damages.

Third Embodiment

Hereinafter, a third embodiment of the invention will be described with reference to FIG. 7. The same and corresponding portions as those of the configuration in the first embodiment are denoted by the same reference numerals, and the description thereof will be omitted.

Figure 7:
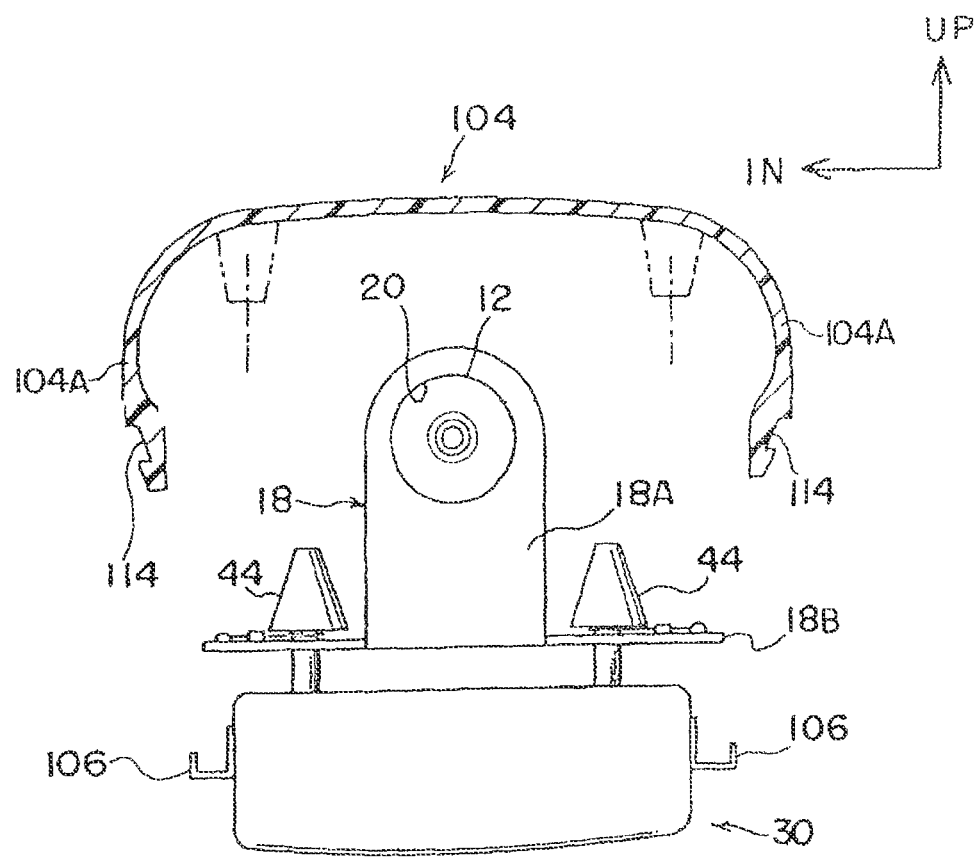
FIG. 7 is a sectional view taken along the vehicle-width direction, which shows an entire configuration of a knee airbag device and a connecting method thereof according to a third embodiment when a column upper cover is separated from a column lower cover.
Figure 7:
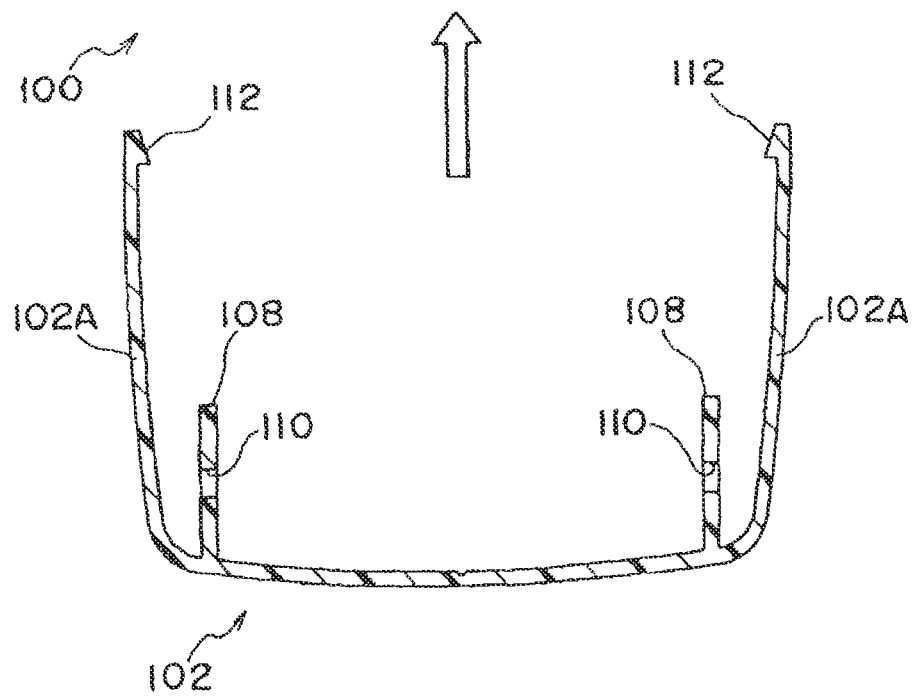

As shown in FIG. 7, in a knee airbag device 100 according to the third embodiment, it is possible to fit a column lower cover 102 to the airbag module 30 and a column upper cover 104 by one action.

More specifically, a plurality of hooks 106 are provided on both side portions of the airbag module 30 (i.e., sidewalls of a substantially box-shaped module casing (not shown) in the vehicle-width direction, which houses the inflator and the knee airbag). The plurality of hooks 106 are provided along an axial direction of the steering column 12.

Leg portions 108 corresponding to the aforementioned hooks 106 are integrally formed in an inner portion of the column lower cover 102. The leg portions 108 protrude upward toward the steering column 12 for a predetermined length. Each of the leg portions 108 includes a rectangular engagement hole 110 at a predetermined position in a height direction of the leg portion 108. Thus, the hook 106 is engaged with the leg portion 108 through the engagement hole 110.

Further, engagement nails 112 are integrally formed in inner portions of upper edge portions of sidewalls 102A of the column lower cover 102 at appropriate intervals. The column upper cover 104 includes engaged portions 114. The engaged portions 114 are recessed portions formed in outer portions of lower edge portions of sidewalls 104A of the column upper cover 104. The engagement nails 112 are engaged with the respective engaged portions 114.

(Advantageous effects obtained in the embodiment)
According to the aforementioned configuration, it is possible to easily fit the column lower cover 102 to the airbag module 30 and the column upper cover 104 in a manner as described below.

First, in the bracket attachment process, the bracket 18 is attached to the rear end portion of the steering column 12. Next, in the airbag module fitting process, the airbag module 30 including the inflator 34 and the knee airbag 36 is fitted to the bracket 18 by the snap-fit action. Then, the column upper cover 104 is fixed above the rear end portion of the steering column 12 by means of screw-fastening or the like. Next, in the column lower cover fitting process, the column lower cover 102, which covers the rear end portion of the steering column 12 from below, is fitted to the airbag module 30 and the column upper cover 104 by one action. More specifically, the hooks 106 provided on the sidewalls of the module casing of the airbag module 30 are engaged, by elastic deformation, with the respective engagement holes 110 of the leg portions 108 formed along the right and left sidewalls 102A of the column lower cover 102, and the engagement nails 112 formed on the sidewalls 102A of the column lower cover 102 are engaged, by elastic deformation, with the engaged portions 114 formed on the column upper cover 104.

As described above, according to the third embodiment, the column lower cover 102 is fixed to the airbag module 30 from below by engaging the hooks 106 of the airbag module 30 with the engagement holes 110 of the column lower cover 102, and the column lower cover 102 is fitted to the column upper cover 104 through engagement between the engagement nails 112 and the engaged portions 114 by one action. In this way, the column lower cover 102 is fitted to the airbag module 30 and the column upper cover 104 by one action, and thus, it is possible to easily fit the column lower cover 102 to the airbag module 30 and the column upper cover 104. As a result, according to the third embodiment, it is possible to easily connect the column lower cover 102 to the steering column 12.

[Supplementary description of the embodiments] (1) In the third embodiment, the column lower cover 102 is fitted to the airbag module 30 and the column upper cover 104 by one action. However, as long as the column lower cover 102 is fitted to the airbag module 30 and the column upper cover 104 by engaging the column lower cover 102 with the airbag module 30 and the column upper cover 104, the number of action(s) may not necessarily be one, and may be more than one.

(2) In the aforementioned embodiments, the spring members 28 that are substantially Ω-shaped when attached to the bracket 18 are employed as urging members. However, the shape and configuration of the spring is not limited to this, and other springs in different shapes and configurations may be employed in the invention. Further, in the aforementioned embodiments, the spring members 28 are configured so that the spring members 28 do not apply urging force to the fitting portions 44 of the airbag module 30 when the spring members 28 are in the fixing state as well as when the spring members 28 are in the releasing state. However, the invention is not limited to this configuration, and the spring member 28 may be configured so that that the urging force of the spring member 28 is applied to the corresponding fitting portion 44 when the spring member 28 is in the fixing state, for example, by setting the distance between the pair of the leg portions 28B of the spring member 28 in the fixing state to be slightly smaller than the diameter of the neck portion 44B. If the urging force of the spring member is applied to the corresponding fitting portion when the spring member is in the fixing state, the airbag module is stably fitted to the bracket, thereby preventing looseness of the airbag module 30, and further, preventing misalignment of the airbag module 30 when the knee airbag 36 is deployed.

(3) In the aforementioned embodiments, the urging members, such as the spring members, are employed to fit the airbag module 30 to the bracket 18. However, the invention is not limited to this configuration, and the fitting portions of the airbag module 30 may be fixed and released without using the urging members, such as the spring members. For example, a bracket may include a sliding member, and the airbag module 30 may be fixed and released by sliding the sliding members.

The invention claimed is:

1. A knee airbag device comprising:
a column lower cover that covers a rear end portion of a steering column from below;

a column upper cover that is fitted to the column lower cover, and covers the rear end portion of the steering column from above; and an airbag module that is disposed inside the column lower cover when the airbag module is connected to the steering column, the airbag module including a gas generation portion that generates gas when the gas generation portion is operated, and a knee airbag that is housed in the airbag module in a folded state and is inflated and deployed by the gas supplied from the gas generation portion; and a bracket that includes at least one nail portion and at least one urging member, the at least one urging member being capable of temporarily engaging the at least one nail portion, and the bracket is attached to a rear end portion of the steering column, wherein the airbag module is moved toward the steering column from below, and is fixed to the bracket; and the column lower cover is fixed to the airbag module by hooking the column lower cover to the airbag module from below, and is fitted to the column upper cover through engagement between the column lower cover and the column upper cover.

2. The knee airbag device according to claim 1, wherein:
the column lower cover is fitted to the column upper cover by one action.

3. A method of connecting a knee airbag device, comprising:
attaching a bracket to a rear end portion of a steering column, the bracket includes at least one nail portion and at least one urging member, the at least one urging member being configured to temporarily engage the at least one nail portion by way of a snap-fit mechanical engagement;

fixing a column lower cover, whose lower surface includes a module fitting opening portion that is large enough for an airbag module to pass through, below the rear end portion of the steering column, wherein the airbag module includes a gas generation portion that generates gas when the gas generation portion is operated, and a knee airbag that is housed in the airbag module in a folded state and is inflated and deployed by the gas supplied from the gas generation portion;

moving the airbag module toward the steering column from below;

snap-fitting the airbag module to the bracket through the module fitting opening portion; and fitting a cover to the column lower cover from outside the column lower cover so that the module fitting opening portion of the column lower cover is closed by the cover.

4. The method of connecting a knee airbag device according to claim 3, wherein:
fitting the airbag module to the bracket by sliding at least one fixing member that fixes the airbag module to the bracket through the module fitting opening portion.

5. The method of connecting a knee airbag device according to claim 3, wherein:
fitting the airbag module to the bracket by operating at least one fixing mechanism one time through the module fitting opening portion, wherein the fixing mechanism removably fixes the airbag module to the bracket.

6. The method of connecting a knee airbag device according to claim 3, wherein:
a door portion that is manually opened and closed is provided in a sidewall of the column lower cover, and the door portion is opened when the airbag module is fitted to the bracket, and closed after the airbag module is fitted to the bracket.

7. A method of connecting a knee airbag device, comprising:
attaching a bracket to a rear end portion of a steering column, the bracket includes at least one nail portion and at least one urging member, the at least one urging member being configured to temporarily engage the at least one nail portion by way of a snap-fit mechanical engagement;

moving an airbag module toward the steering column from below;

fitting the airbag module to the bracket, wherein the airbag module includes a gas generation portion that generates gas when the gas generation portion is operated, and a knee airbag that is housed in the airbag module in a folded state and is inflated and deployed by the gas supplied from the gas generation portion; and engaging a column lower cover, which covers the rear end portion of the steering column from below, with at least one engagement portion provided in the airbag module, and fitting the column lower cover to a column upper cover, which covers the rear end portion of the steering column from above, through engagement between the column lower cover and the column upper cover.

8. The method of connecting a knee airbag device according to claim 7, wherein:
the column lower cover is fitted to the column upper cover by one action.

\* \* \* \* \*